United States Patent [19]

Perry

[11] Patent Number: 4,979,843

[45] Date of Patent: Dec. 25, 1990

[54] REMOVABLE END PLUG

[75] Inventor: Harold Perry, Wichita, Kans.

[73] Assignee: Wirthco Engineering, Inc., Bloomington, Minn.

[21] Appl. No.: 535,318

[22] Filed: Jun. 8, 1990

[51] Int. Cl.$^5$ .............................. B25G 3/00; F16D 1/00
[52] U.S. Cl. ........................................ 403/19; 403/24; 403/341; 220/305; 293/155; 293/106
[58] Field of Search ................ 220/305, 352; 293/155, 293/154, 122, 106; 285/901; 403/341, 19, 24

[56] References Cited

U.S. PATENT DOCUMENTS

| | | | |
|---|---|---|---|
| 1,491,325 | 4/1924 | Thomas, Jr. ........................ | 220/305 |
| 1,519,967 | 12/1924 | Hughes ............................ | 293/122 X |
| 3,048,297 | 8/1962 | Elliott et al. ...................... | 220/305 |

Primary Examiner—Andrew V. Kundrat
Attorney, Agent, or Firm—Roger W. Jensen

[57] ABSTRACT

A removable end plug for closing off the open end of a hollow vehicle bumper. The end plug comprises a molded unitary body of flexible deformable material having four side sections in the form of a hollow square and a four sided truncated pyramid shaped operator portion connected to one transverse edge of the side sections. The operator portion has a normal position whereat the truncated pyramid extends longitudinally away from the bumper opening and a reverse truncated pyramid position to cause said side sections to be bowed transversely outwardly and thereby substantially increase the force of engagement between the outer surfaces of said side sections and the four inside surfaces of the bumper to thereby lock the plug to the bumper.

10 Claims, 1 Drawing Sheet

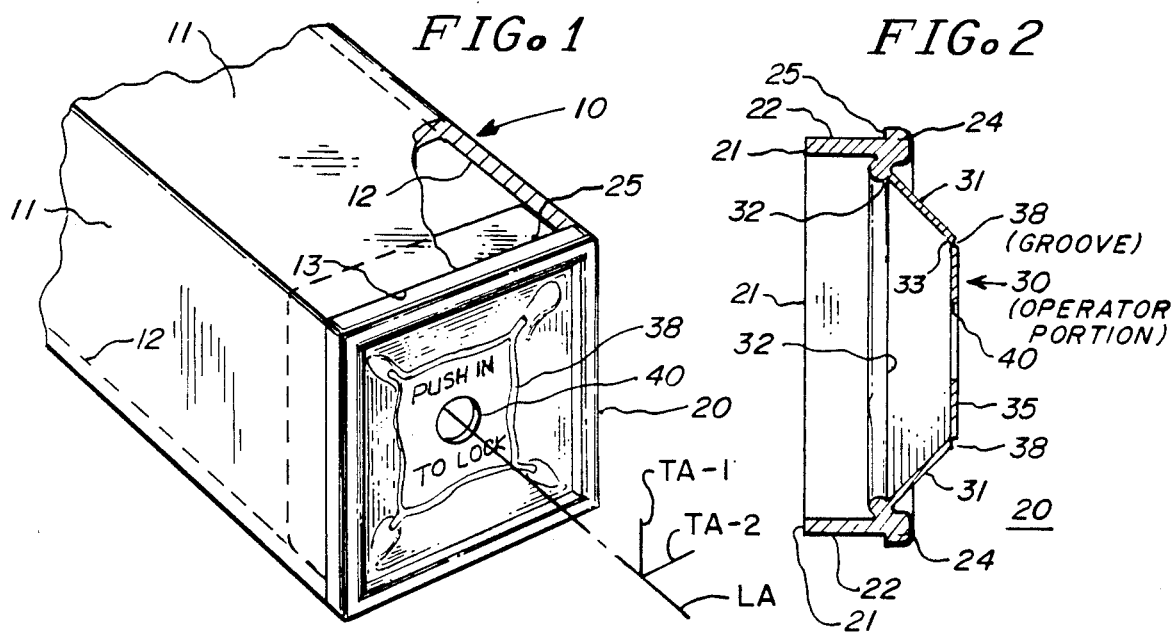
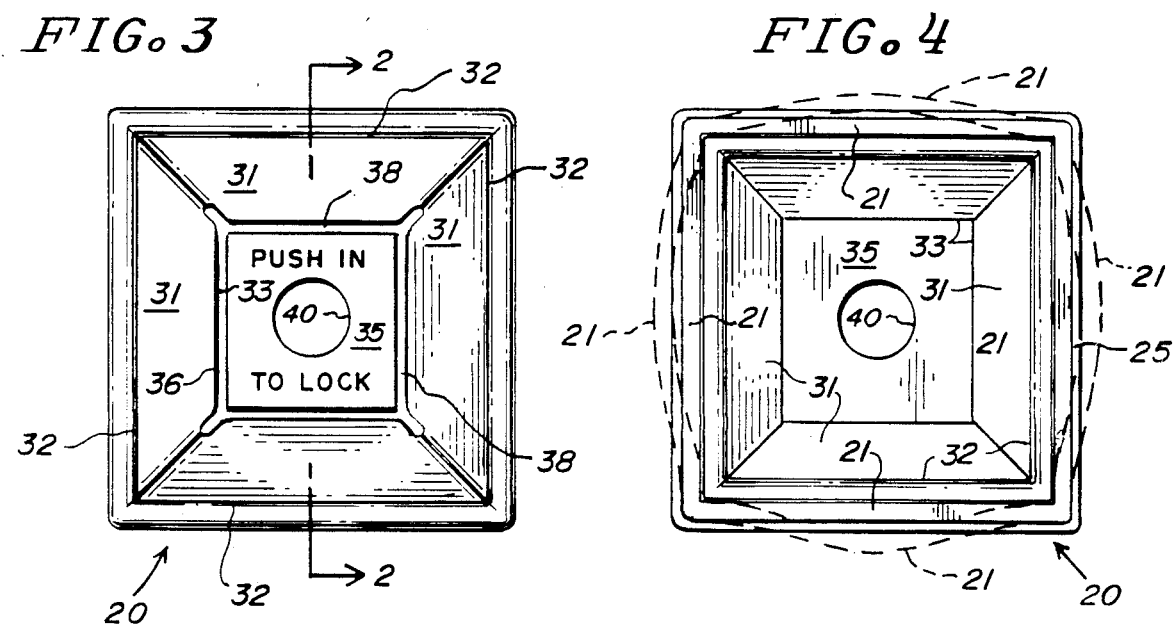
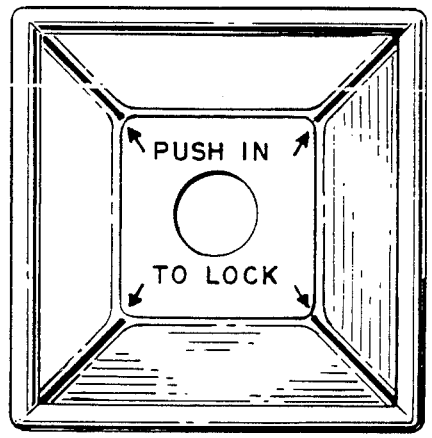

REMOVABLE END PLUG

BACKGROUND OF THE INVENTION

Some recreational vehicles (RV) in use currently have rather large bumpers front and back which perform a storage function in addition to the primary "bumper" function. To explain, the bumpers are usually made of high strength hollow tubing, usually steel, and many of these bumpers have a hollow cross section with a generally square shape, i.e., with four inside surfaces which are parallel to and transversely displaced from the main or longitudinal axis of the hollow vehicle bumper.

An example of the storage function of the bumper is to store rather large diameter flexible hoses used for plumbing and/or sewage hook ups when the RV is at rest at a RV park or the like.

My invention provides the important function of having an inexpensive, reliable, quickly insertable, lockable and removable end plug for the bumper. My bumper plug is easily insertable into the open end of the bumper and, with a simple inboard pushing action, is locked in place thus holding securely hoses or the like which may be within the bumper and retaining same there notwithstanding the movement of the RV along a highway with attendant bumping and centrifugal force. When desired the plug can be easily unlocked and removed.

BRIEF DESCRIPTION OF THE INVENTION

My invention comprises a molded unitary body of flexible and deformable material adapted to be inserted into the open end of a hollow vehicle bumper having a longitudinal axis and first and second transverse axes.

The unitary body is a complex shape having four relatively thin side sections continuously and serially connected together to form a hollow square. The side sections thus have outer surfaces which are generally parallel to and transversely displaced from the longitudinal axis in the preferred embodiment said outer surfaces are slightly angled to provide a shallow tapered surface to facilitate, as will be explained below, the easy insertion of the plug into the open end of the bumper. The four side sections have preselected transverse lengths, longitudinal widths, and relatively thin transverse thickness.

The molded unitary body further includes shoulder means disposed along one transversely extending edge of each of the side sections, the shoulder means extending transversely outward so as to form four coplanar abutment surfaces or shoulders. The abutment surfaces are intended to coact with the end surfaces of the vehicle bumper.

The molded unitary body further includes a four sided truncated shaped operator portion having four sloping relatively thin side wall elements each connected at a first transversely extending edge to the juncture of a respective side section and its respective shoulder means; the operator portion further comprises a square shaped planar relatively thin central element having each of its four edges connected respectively to a second transversely extending edge of one of the four side wall elements.

In the preferred embodiment the operator portion has a centrally positioned hole provided in the square shaped central element to facilitate the unlocking and removal of a "locked" plug from the bumper as will be explained below.

The preselected transverse length of the side sections is slightly less than the inside transverse dimension of the hollow vehicle bumper to facilitate the insertion of the end plug into the end opening of the bumper. Further, as indicated, a slight taper may be provided on the outer surfaces of said side section to facilitate the insertion. In the preferred embodiment the end plug after insertion into the bumper will have the outer surfaces of the side sections in actual or at least close or near engagement with the four inside surfaces of the bumper and with, as aforesaid, the abutment surfaces of the plug in engagement with the end edge surfaces of the bumper.

At this point the operator portion is in its first and normal position, the sloping side wall and square shaped central elements forming the sides and top of a truncated pyramid extending longitudinally away (outboard) from said side sections so as to facilitate the insertion of the plug into the bumper. In this position the plane defined by the central element is normal to the longitudinal axis. However, in this position the plug could not be assuredly retained in the bumper when the RV is in motion and accordingly my invention provides a locking means for locking the plug to the bumper.

The locking function is provided by the operator portion of the plug being manually displaceable from the aforesaid first and normal position to a "pushed in" position whereat the side wall and square shaped central elements are displaced longitudinally inboard, i.e., in the direction of the bumper, so as to be within the side sections somewhat in the form of a reverse truncated cone. The displacement of the plug to this latter position has the effect of putting outward pressure on the four side sections to thereby substantially increase the force of engagement between the outer surfaces of said side sections and the four inside surfaces of the bumper to thereby lock the plug to the bumper.

In the preferred embodiment of the invention a square groove is provided in the material of the plug on the outer face of the operator portion at the juncture of the square edges of the square shaped central element with each of the side wall elements; this groove facilitates the locking procedure and tends to assure against any inadvertent unlocking of the plug.

When it is desired to unlock the plug then an appropriate removal means is used to force the plug back into its first and normal position; in the preferred embodiment the removal means is the aforesaid centrally located hole or aperture in the square shaped central element of the molded unitary body of flexible deformable material.

BRIEF DESCRIPTION OF THE DRAWINGS

FIG. 1 is an isometric view of an RV type hollow bumper having a generally square hollow cross section with my unique plug installed therein and locked in place;

FIGS. 2 and 3 show the preferred embodiment of my plug, FIG. 3 showing the outside or outboard end of the plug and FIG. 2 being a cross section of the plug as viewed along section lines 2—2 of FIG. 3;

FIG. 4 is a view of the inboard or backside of the plug; and

FIG. 5 shows an outside or outboard end view of an alternate embodiment of the plug.

DETAILED DESCRIPTION OF PREFERRED EMBODIMENT OF THE INVENTION

In FIG. 1 reference numeral 10 designates a hollow vehicle bumper having a longitudinal axis (LA) and first and second transverse axes (TA-1 and TA-2), said bumper having a generally square hollow cross section defined by four outside surfaces 11 and four inside surfaces 12 which are parallel to and transversely displaced from the longitudinal axis. Reference numeral 13 designates the four coplanar end surfaces of the hollow bumper. The terms "outboard" and "inboard" used herein are to describe, respectively, longitudinal movement or direction, as the case may be, of "away from" or "toward" the bumper.

Referring to FIGS. 2, 3 and 4, the preferred embodiment of my end plug, the reference numeral 20 designates the plug which, as aforesaid, is a unitary molded body of flexible deformable material. In the preferred embodiment I use a Telcar compound 89P809DBK sold by the Tecknor Apex Company.

The molded unitary body comprises four relatively thin side sections 21 each having a rectangular shape, the side sections being continuously and serially connected together to form a hollow square. The side sections have preselected transverse lengths, longitudinal widths and relatively thin transverse thickness all in accordance with the dimensions of the vehicle bumper with respect to which it is to be used. The outer surfaces of said side sections 21 are designated by reference numeral 22.

A shoulder means 24 is disposed along one transverse edge of each of the side sections and extends slightly transversely in the outward direction away from the longitudinal axis so as to define, at the inboard edge thereof, four coplanar abutment surfaces 25 which are adapted to coact, upon insertion of the plug into the hollow bumper, with end surfaces 13 of the bumper.

The molded unitary body further includes a four sided truncated pyramid shaped operator portion 30 having four relatively thin side wall elements 31 each connected at a first transverse edge 32 thereof to the juncture of the side sections and their respective shoulder means as depicted best in FIG. 2. The truncated pyramid shaped operator portion 30 additionally includes a square shaped planar and relatively thin central element 35 having its four edges connected respectively to the second transverse edge 33 of the aforesaid four side wall elements 31.

The thickness of the elements 31 and 35 is preselected so as to have the desired strength to perform the locking function as will be explained below.

A groove 38 shown in FIGS. 1, 2 and 3 is provided on the outboard surface of the operator portion at the juncture of the four edges of the central square shaped element 35 and the four side wall elements 31; the groove 38 has been found to be preferable for many applications of my plug in that it tends to provide a snap function and hold the plug in the operated position a will be explained below. Thus the groove 38 is, in effect, a reduction in the thickness of the material at this juncture.

In the preferred embodiment a removal means in the form of a centrally located hole 40 of element 35 provides an easy way for unlocking and removal of the plug from the locked position, the diameter of the hole being large enough to accept a human finger or other equivalent means for pulling out the central element 35 and thus popping the plug from the locked position to the normal position depicted in FIGS. 2 and 3.

Thus in operation the plug 20 may be inserted into the open end of the bumper 10 as aforesaid with the outside surfaces 22 of the side sections 21 being adjacent to and preferably in loose "touching" engagement with the inside surfaces 12 of the bumper. At this point the plug is in the "normal" position and has the shape shown in FIG. 2, the plane of the central element being normal to the longitudinal axis. To lock the end plug in position the human operator then causes the operator portion 30 to be changed from the position shown in FIG. 2 to an inverted truncated pyramid like position as is depicted in FIG. 1. The action of the inverted truncated pyramid tends to cause a bowing out or outward force on the side sections 21 which, but for the constraint of the bumper would cause the side sections 21 to have the shape shown by the dotted lines in FIG. 4. However, because of the constraint of the bumper the outward force is manifested by a greatly increased engagement between the outer surface 22 of the side sections 21 and the inside surfaces 12 of the bumper thus providing the desired locking function.

The plugs are intended to provide sufficient mechanical restraint and associated locking action so that any cargo within the bumper such as a piece of heavy rubber hose, will be contained within the bumper notwithstanding the movement of the RV along bumpy, non-level road surfaces and/or during a relatively high speed turning maneuver producing centrifugal force on the end plug as well as the contents within the bumper.

At any time that it is desired to remove the plug then this is easily accomplished by using the removal means 40 to pull out the operator portion 30 so as to unlock the plug and return the plug configuration to that shown best in FIG. 2.

Those skilled in the art will recognize that although the bumper has been depicted as having a hollow square configuration the principals of this invention could be applicable to a bumper that was not a perfect square. For example the cross section of the bumper could be slightly rectangular and still be within the scope of the appended claims hereto.

FIG. 5 is a plan view or end view of a plug which is generally the same as the plug shown in FIGS. 1-4 except that groove 38 has been omitted to cover the case where the overall design of the plug permits the attainment of the desired locking function without the use of a groove.

Those skilled in the art will recognize that various alterations are possible from the arrangements specifically shown herein; therefore the scope of the invention should be measured only by the appended claims.

The embodiments of the invention for which exclusive property rights are claimed are defined in the following claims:

1. A removable end plug for closing off an open end of a hollow vehicle bumper having (i) a longitudinal axis and first and second transverse axes, (ii) a generally square hollow cross section defined by four inside surfaces parallel to and transversely displaced from said longitudinal axis, and (iii) an end characterized by four coplanar edges, said end plug comprising a molded unitary body of flexible deformable material, said body having:
   a. four thin side sections continuously serially connected together to form a hollow square and with said side sections having preselected transverse length, longitudinal width, and relatively thin transverse thickness, b. shoulder means disposed along one transversely extending edge of said side sections and extending transversely outward so as to form four coplanar abutment surfaces, and c. a four sided truncated pyramid shaped operator portion having four sloping side wall elements each connected at a first transversely extending edge thereof to the juncture of a respective side section and its respective shoulder means and a square shaped central element having edges connected respectively to a second transversely extending edge of one of said side wall elements;

said preselected transverse length of said side sections being slightly less than the inside transverse dimension of said four inside surfaces of said hollow vehicle bumper so that said end plug may be inserted into said open end of said bumper with the outer surfaces of said side sections being respectively in engagement with said four inside surfaces of said bumper and with said abutment surfaces in engagement with said end edge surfaces of said bumper, said operator portion having a first and normal position whereat said sloping side wall and square shaped central elements form a truncated pyramid extending longitudinally outboard from said side sections so as to facilitate the insertion of said plug into said open end of said bumper as aforesaid, and said operator portion being manually operable from said first position to a pushed in position whereat said side wall and square shaped central elements are displaced longitudinally to be within said side sections to thereby cause said side sections to tend to bow outwardly from said longitudinal axis and thereby substantially increase the force of engagement between said outer surfaces of said side sections and said four inside surfaces of said bumper to thereby lock said plug to said bumper.

2. Apparatus as described in claim 1 further characterized by including means for selectively unlocking and removing said end plug from said bumper.

3. Apparatus as described in claim 2 further characterized by said unlocking and removing means being means for applying an outboard longitudinal force to said square shaped central element.

4. Apparatus as described in claim 3 further characterized by said unlocking and removing means comprising an aperture in said central element.

5. A removable end plug for closing off an open end of a hollow vehicle bumper having (i) a longitudinal axis and first and second transverse axes, (ii) a generally square hollow cross section defined by four inside surfaces parallel to and transversely displaced from said longitudinal axis, and (iii) an end, said end plug comprising a molded unitary body of flexible deformable material, said body having:

a. four thin side sections continuously serially connected together to form a hollow square and with said side sections having preselected transverse length, longitudinal width, and relatively thin transverse thickness, b. shoulder means disposed along one transversely extending edge of said side sections and extending transversely outward so as to form four abutment surfaces, and c. a four sided truncated pyramid shaped operator portion having four sloping side wall elements each connected at a first transverse edge thereof to the juncture of a respective side section and its respective shoulder means and a square shaped central element having edges connected respectively to a second transversely extending edge of one said side wall elements;

said preselected transverse length of said side sections being slightly less than the inside transverse dimension of said four inside surfaces of said hollow vehicle bumper so that said end plug may be inserted into said open end of said bumper with the outer surfaces of said side sections being respectively in register with said four inside surfaces of said bumper and with said abutment surfaces in register with said end of said bumper, said operator portion having a first and normal position whereat said sloping side wall and square shaped central elements form a truncated pyramid extending longitudinally outboard from said side sections so as to facilitate the insertion of said plug into said open end of said bumper as aforesaid, and said operator portion being manually operable from said first position to a pushed in position whereat said side wall and square shaped central elements are displaced longitudinally inboard to thereby cause said side sections to tend to bow outwardly from said longitudinal axis and thereby produce a substantial force of engagement between said outer surfaces of said side sections and said four inside surfaces of said bumper to thereby lock said plug to said bumper.

6. Apparatus as described in claim 5 further characterized by including means for selectively unlocking and removing said end plug from said bumper.

7. Apparatus as described in claim 6 further characterized by said unlocking and removing means being means for applying an outboard longitudinal force to said square shaped central element.

8. Apparatus as described in claim 7 further characterized by said unlocking and removing means comprising an aperture in said central element.

9. Apparatus as described in claims 1 or 5 further characterized by said operator portion having a reversed truncated pyramid shape when displaced to said pushed in position.

10. Apparatus as described in claims 1 or 5 further characterized by said operator portion having a groove extending along the connection of the edges of said square shaped central element and the second transversely extending edges of said sloping side wall elements.

* * * * *